3,348,928
PROCESS FOR PREPARING A BERYLLIUM BOROHYDRIDE
David B. Kellom and Carlos M. Bowman, Midland, Lz F. Lamoria, Bay City, and Buddy L. York, Akron, Mich., assignors to The Dow Chemical Company, Midland, Mich., a corporation of Delaware
No Drawing. Filed July 1, 1963, Ser. No. 292,167
3 Claims. (Cl. 23—361)

ABSTRACT OF THE DISCLOSURE

The invention is an improved process for preparing beryllium borohydride by reacting sodium borohydride and beryllium chloride at molar proportions of from 1.0–2.0/2.0 (expressed as $BeCl_2/NaBH_4$) for a period of from about 0.5 to about 2 hours or more at a maximum pressure of about 10 millimeters mercury absolute and a temperature of from about 50 to about 150° C.

---

This invention relates to the preparation of borohydrides and more particularly is concerned with a novel process for preparing beryllium borohydride in high yields.

Traditionally the preparation of beryllium borohydride in respectable yields (about 70 to 80%) has entailed the reaction of lithium borohydride with beryllium chloride for lengthy periods of time, 8 hours or more, at temperatures usually of 150° and higher. Conversely, heretofore with sodium borohydride and beryllium chloride at best only relatively low yields, e.g. up to about 40% have been reported.

Now unexpectedly the present process discloses the production of beryllium borohydride in higher yields (about 90% and higher) at mild reaction conditions employing sodium borohydride as a reactant.

In accordance with the present process, a beryllium salt, preferably beryllium chloride, is reacted with sodium borohydride at molar proportions of from 1.0–2.0/2.0 (expressed as $BeCl_2/NaBH_4$) for a period of from about 0.5 to about 2 hours or more at a maximum pressure of about 10 millimeters mercury absolute and a temperature of from about 50 to about 150° C.

Preferably a mixture of berryllium chloride and sodium borohydride at $BeCl_2/NaBH_4$ molar proportions of from about 1.05–1.10/2.0 is reacted for a period of from about 1 to 2 hours at a pressure of from about 0.1 to about 0.5 millimeter mercury absolute and a temperature of from about 80 to about 100° C.

The beryllium borohydride readily is separated from the reaction mass by sublimation or other separatory procedure known to one skilled in the art.

The reaction is carried out in an inert, substantially moisture-free, oxygen-free atmosphere, e.g. dry nitrogen to eliminate any possible flammable reaction between the product and oxygen and/or moisture. The reactors, material transporting, handling and storage apparatus and the like for use in carrying out the present process are to be of such materials of construction and design so as to withstand the reaction temperatures and pressures. Also, these should not detrimentally attack the reactants or products nor in turn be attacked by these compounds.

The following example will serve to further illustrate the present invention but is not meant to limit it thereto.

*Example*

About 8.8 grams (0.11 gram mole) of sublimed beryllium chloride and about 7.57 grams (0.20 gram mole) of a high purity sodium borohydride were placed along with a magnetic stirring bar in a 125 milliliter round bottom reaction flask. All of these additions were made in a dry box in a substantially oxygen-free, inert atmosphere.

The flask was removed from the dry box, and attached to two 40–50 milliliter receiving traps connected in series to a low pressure line. A heater and magnetic stirrer for the flask also were provided. The system was flushed with an inert gas, e.g. substantially moisture-free nitrogen.

The first trap was cooled with Dry Ice and the pressure on the system reduced to from about 0.05 to about 0.3 millimeter. The reaction mixture was stirred and heated at a temperature of from about 80 to 100° C. having the appearance of a semi-fluid melt at this temperature for about 2 hours during which time beryllium borohydride collected in the first cold trap.

The product in the first trap was sublimed into the second trap at a temperature of from about 40 to about 50° C. and a pressure of about 0.1 millimeter giving a yield of 3.41 grams (89% of theoretical) of high purity beryllium borohydride.

In a manner similar to that described for the foregoing example, beryllium chloride and sodium borohydride at a molar proportion ($BeCl_2/NaBH_4$) of about 2.0/2.0 can be reacted at a temperature of about 150° C. at a pressure of about 10 millimeters mercury absolute for about 0.5 hour to give the beryllium borohydride product.

A mixture of $BeCl_2/NaBH_4$ at a gram mole proportion of about ½ can be reacted at a temperature of about 50° C. and a pressure of about 0.01 millimeter mercury absolute for about 1 hour to produce beryllium borohydride.

Various modifications can be made in the present invention without departing from the spirit or scope thereof for it is understood that we limit ourselves only as defined in the appended claims.

We claim:
1. In a process for preparing beryllium borohydride by reacting a beryllium halide and sodium borohydride the improvement which comprises:
   (a) utilizing beryllium chloride as the beryllium halide reactant and providing said beryllium chloride and sodium borohydride at $BeCl_2/NaBH_4$ gram mole proportions of from about 1 to 2/2,
   (b) reacting the beryllium chloride-sodium borohydride mixture at a temperature of from about 50 to about 150° C. and a maximum pressure of about 10 millimeters mercury absolute for a period of from about 0.5 to about 2 hours, and
   (c) recovering said beryllium borohydride.
2. The improved process as defined in claim 1 wherein beryllium chloride and sodium borohydride are mixed at $BeCl_2/NaBH_4$ gram mole proportions of from about 1.05 to 1.1/2 and the resulting mixture is agitated at a temperature of from about 80 to about 100° C. at a pressure of from about 0.1 to about 0.5 millimeter mercury absolute for a period of from about 1 to about 2 hours.
3. The process as defined in claim 2 and including the step of subliming the beryllium borohydride product.

References Cited

Bulletin 502A, "Sodium Borohydride," pub. by Metal Hydrides, Inc., 1950, pp. 1 and 2.

Schlesinger et al.: "J. Am. Chem. Soc.," vol. 75, pp. 209–213, 1953.

MILTON WEISSMAN, *Primary Examiner.*

BENJAMIN R. PADGETT, CARL D. QUARFORTH, *Examiners.*

L. A. SEBASTIAN, *Assistant Examiner.*